Oct. 9, 1956   O. E. ECKHOFF   2,766,366
STEAM COOKERS
Filed Jan. 24, 1955   4 Sheets-Sheet 1

Orville E. Eckhoff
INVENTOR.

BY *Clarence A. O'Brien*
*and Harvey B. Jackson*
Attorneys

Oct. 9, 1956 O. E. ECKHOFF 2,766,366
STEAM COOKERS
Filed Jan. 24, 1955 4 Sheets-Sheet 2

Orville E. Eckhoff
INVENTOR.

BY Clarence A. O'Brien
and Harvey B. Jackson
Attorneys

Oct. 9, 1956  O. E. ECKHOFF  2,766,366
STEAM COOKERS
Filed Jan. 24, 1955  4 Sheets-Sheet 3
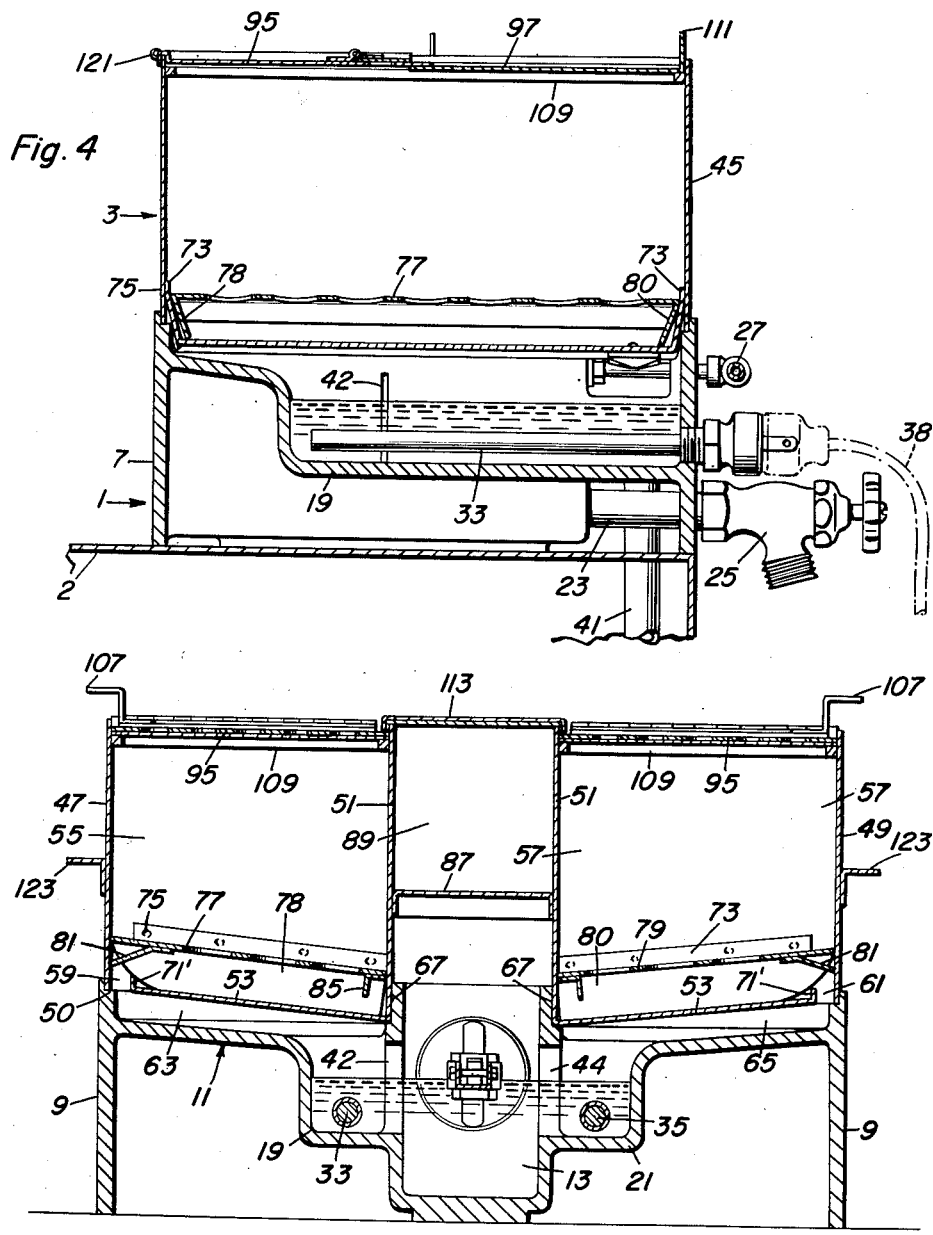
Orville E. Eckhoff
INVENTOR.

Oct. 9, 1956  O. E. ECKHOFF  2,766,366
STEAM COOKERS
Filed Jan. 24, 1955  4 Sheets-Sheet 4

Orville E. Eckhoff
INVENTOR.
BY *Clarence A. O'Brien*
*and Harvey B. Jackson*
Attorneys

United States Patent Office 2,766,366
Patented Oct. 9, 1956

2,766,366

STEAM COOKERS

Orville E. Eckhoff, San Antonio, Tex.

Application January 24, 1955, Serial No. 483,462

5 Claims. (Cl. 219—38)

My invention relates to improvements in steam cookers and is designed especially, although not necessarily, for cooking and serving therefrom weiners and the like and also for warming buns, chili and like accessories for serving with the weiners.

The primary object of my invention is to provide a steam cooker for the above purposes with two separate steam cooking chambers both of which may be used separately for cooking weiners, or either of which may be so used while the other is used for warming buns and the like, and which is provided with a warming chamber for chili or other weiner dressing between the heating chambers warmed from the cooking chambers by convection.

Another object is to provide in such a cooker separate means for converting water into steam for each cooking chamber either simultaneously or for either cooking chamber, selectively, whereby both cooking chambers may be used for cooking or either one while cooked weiners are being served from the other.

Another object is to provide in such a cooker separate means for converting water into steam for each cooking chamber supplied by water from a central well in the cooker, and means for replenishing the water in the well under control of a float valve to a preselected level and from a house water supply when a given quantity has been dissipated in generating steam and whereby to obviate the objectionable task of manually adding water as occasion may require and the danger arising from an operator forgetting to add water as needed.

Still another object is to provide in such a cooker means for draining condensation from the cooking chambers out of the cooker so that it will not find its way back to the steam converting means or the well whereby the weiners or buns or the like in the cooking chambers are not subjected to steam generated from greasy or otherwise fouled water affecting the flavor thereof.

Still another object is to provide a steam cooker which is easy to clean and maintain sanitary, substantially foolproof, light in weight, while strong and comparatively inexpensive to manufacture and operate.

Other objects and advantages will become readily apparent when the following description and claims are read with reference to the accompanying drawings forming part of this specification and in which:

Figure 4 is an enlarged view in transverse section taken on the line 4—4 of Figure 1;

Figure 5 is an enlarged view in longitudinal section taken on the line 5—5 of Figure 2;

Figure 1:
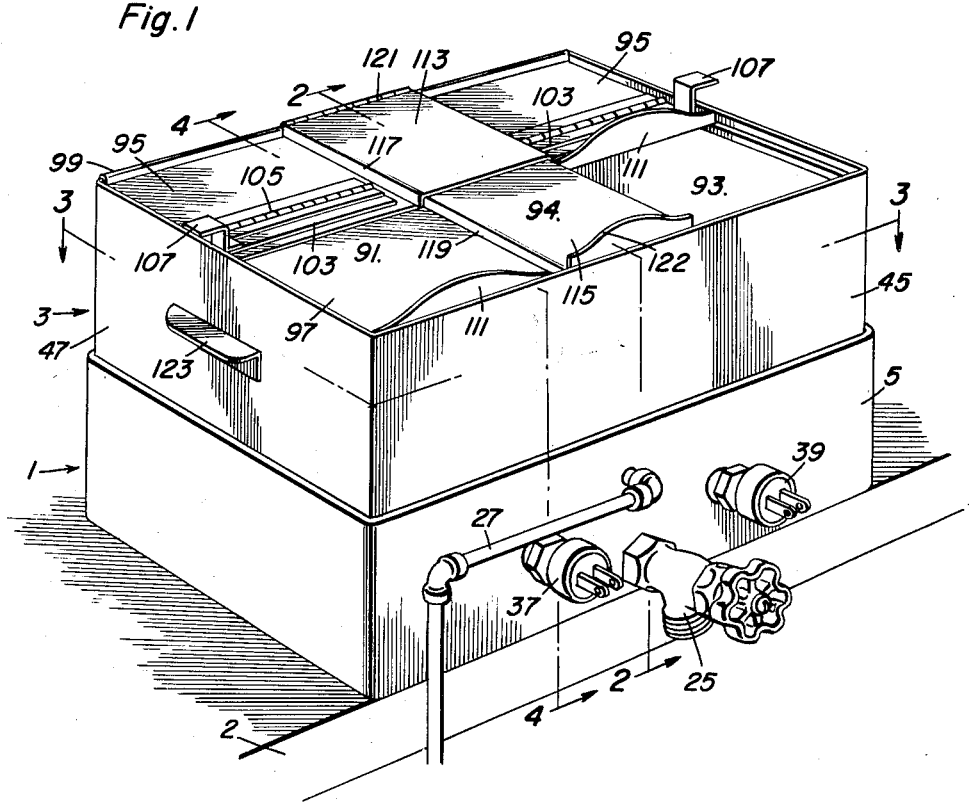
Figure 1 is a perspective view of my improved heater in the preferred embodiment thereof.

Referring to the drawings by numerals, the cooker of my invention as illustrated comprises as its basic components a base section 1 adapted to seat on a counter 2, and a crown section 3.

The base section 1 is an oblong rectangular receptacle having front and rear walls 5, 7, end walls 9 and a bottom 11 integral with said walls 5, 7, 9.

The bottom 11 is formed with a central, narrow transversely extending water supply well 13 of the same depth as said section 1 and which is rectangular and extends forwardly from the rear wall 7. The bottom 11 forms with the front wall 15 of the well 13 and with the front wall 5 of the base section 1 a condensation sump 17 elevated above the bottom of the well 13 and relatively shallower.

At opposite sides of the well 13 and below the top thereof, the bottom 11 of the base section 1 forms with said well a pair of troughs 19, 21 extending transversely of the base section 1 alongside said well 13 above its bottom and to which said bottom 11 inclines downwardly from the rear and end walls 7, 9 for a purpose presently seen.

A well drain pipe 23 tapped into the front end 15 of the well 13 extends horizontally out of the front wall 5 and is provided with a valved fitting 25 for coupling to a drain line, not shown, for draining the well 13 as occasion may require.

A water feed pipe 27 extends through the front wall 5 from a house water line, not shown, and through the sump 17 into the front of the well 13 and terminates in the front of the well 13 in a water feed control valve 29 operated by a float 31. The water feed control valve may be of any conventional type adapted to discharge water into the well 13 when the water falls below a predetermined level in said well 13.

A pair of electric immersion type heating elements 33, 35 extend through the front wall 5 into the front ends of the troughs 19, 21 along the bottoms of said troughs and are provided forwardly of the base section 1 with plug-in connections 37, 39 for electric power lines, as at 38, of a house circuit.

A condensation drain pipe 41 depends from the bottom of the sump 17 for connection to a condensation disposal source, not shown.

The troughs 19, 21 are supplied from the well 13 with water to the same level as that in the well 13 through a pair of vertical slots 42, 44 in the sides of the well 13.

The crown section 3 corresponds in shape to that of the base section to provide rear, front and end walls 43, 45, 47, 49 therein and removably seats at its lower edge with a substantially steam-tight fit in an internal rabbet 50 in the top edge of the base section 1.

A pair of vertical transverse partitions 51 and a pair of bottom walls 53 in the section 3 divide the section 3 into a pair of cooking chambers 55, 57 at opposite sides of the well 13 which overlie the troughs 19, 21 and bottom 11 of the base section 1.

As best shown in Figure 5, the bottom walls 53 are spaced above the bottom 11 of section 1 and from the end walls 47, 49 of section 3 to form transverse slots 59, 61 at the end walls 47, 49 to provide with bottom 11 passages 63, 65 above the trough 19, 21 through which and the slots 59, 61 steam may pass into the cooking chambers 55, 57 from said troughs.

Figure 9:
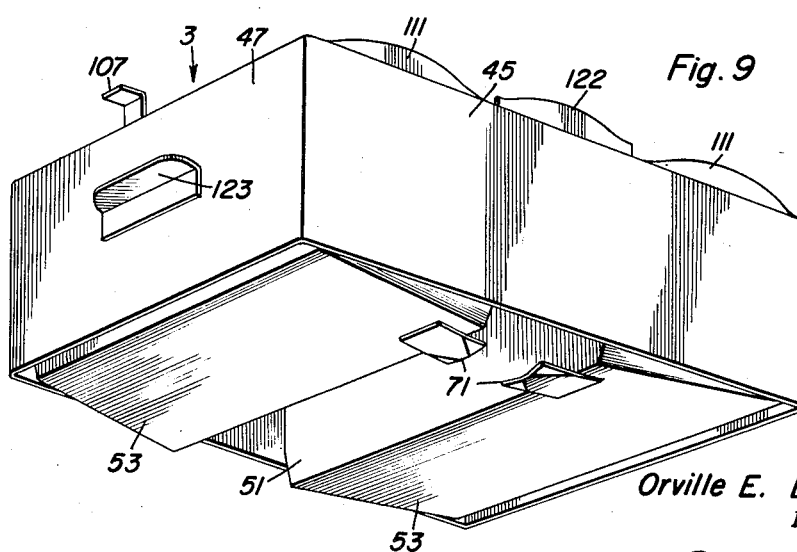
Figure 9 is an enlarged perspective view of a crown section of the cooker.
Figure 2:
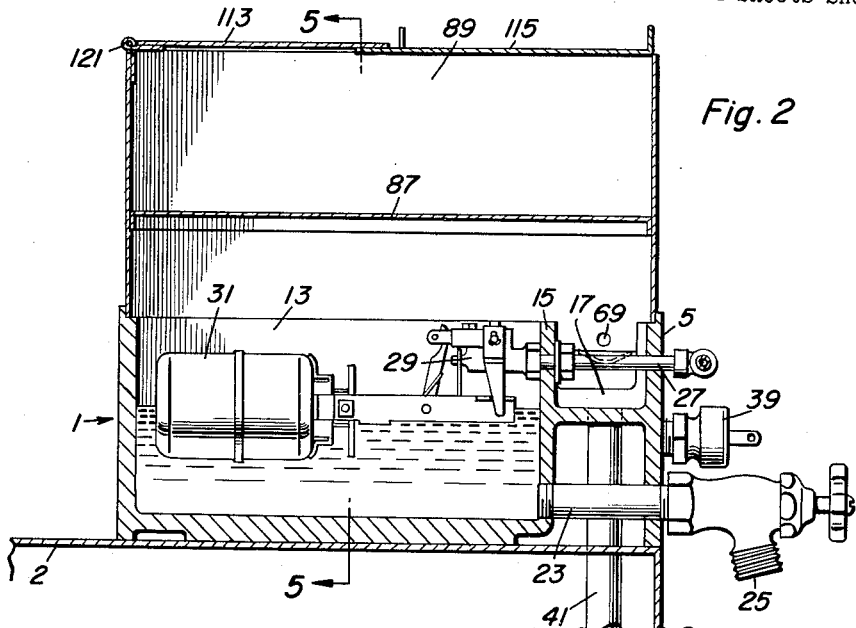
Figure 2 is an enlarged view in transverse section taken on the line 2—2 of Figure 1.
Figure 3:
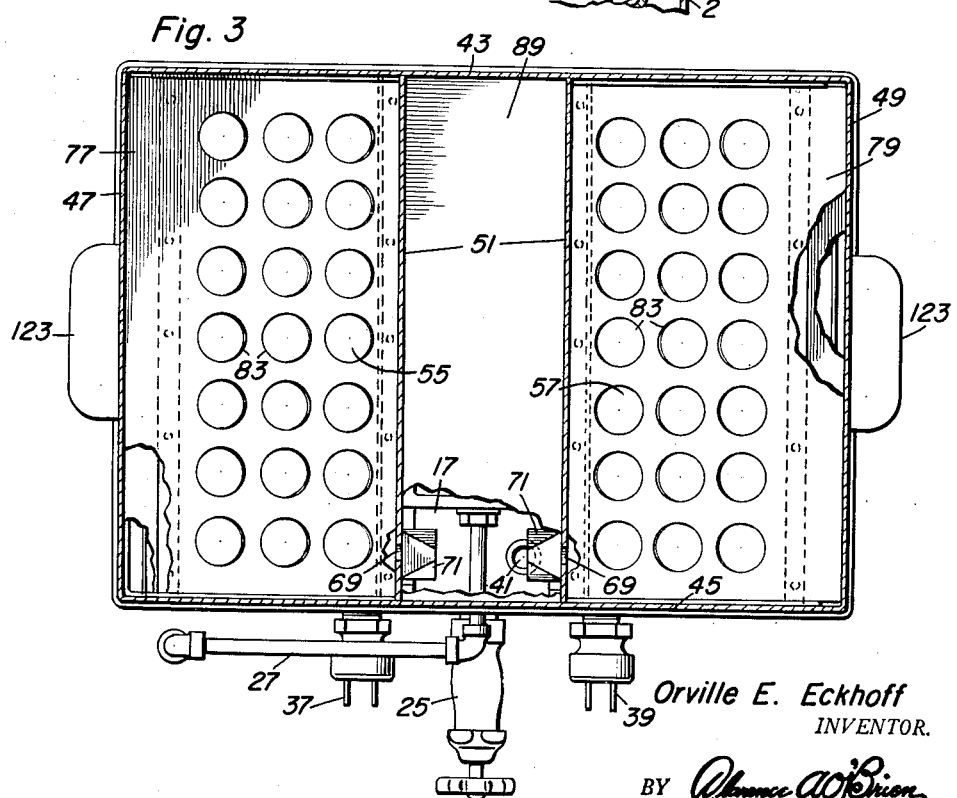
Figure 3 is an enlarged view in horizontal section taken on the line 3—3 of Figure 1, partly broken away.
Figure 6:
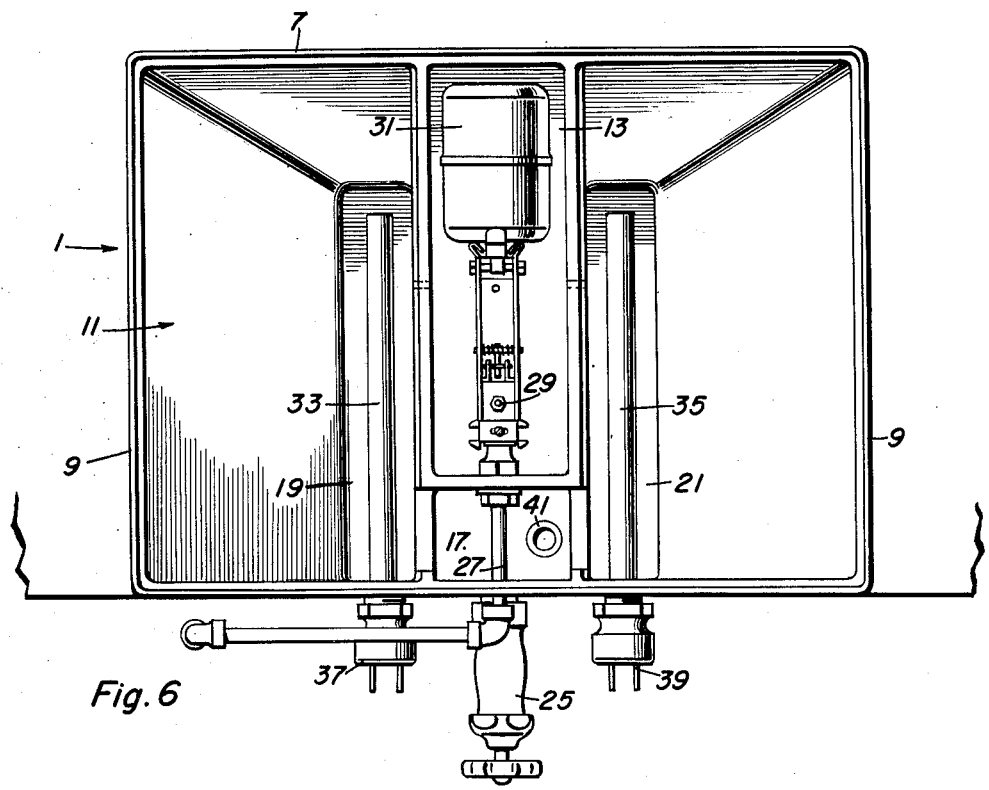
Figure 6 is an enlarged view in plan of a base section of the cooker.
Figure 7:
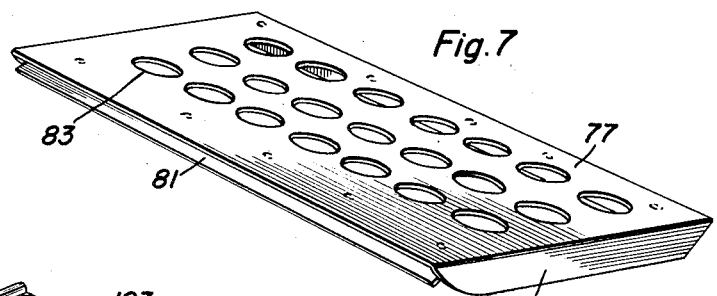
Figure 7 is an enlarged perspective view of one of a pair of grid plates for the cooking chambers.
Figure 8:
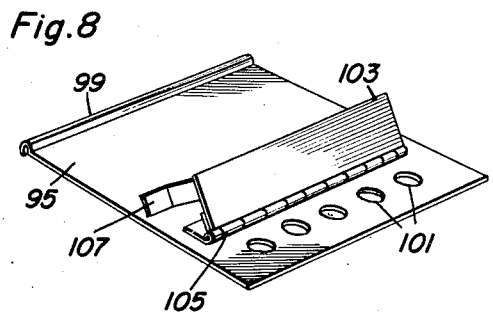
Figure 8 is an enlarged perspective view of a closure plate with which each cooking chamber is provided.

As shown in Figures 2, 5 and 9, the partitions 51 fit downwardly into an external top groove 67 in the sides of the well 13 to provide a steam-tight fit between the section 3 and the well 13 and the bottom walls 53 of the cooking chambers 55, 57 slant downwardly and inwardly to the top of the sump 17 to drain condensation toward said sump and out of condensation discharge openings, as at 69, in the partitions at opposite sides of the sump 17. Drain channels 71 on the bottom walls 53 overlying the sump 17 direct the condensation into the sump. Vertical edge flanges 71' on the bottom walls 53 at the slots 59, 61 reinforce said edges. As best shown in Figures 4, 5 and 9, the bottom walls 53 are narrower than the remainder of section 3 to fit in the base section 1 and are provided with upturned side flanges 73 spot welded, as at 75, to the rear and front walls 43, 45.

A pair of removable apertured grid plates 77, 79 are removably fitted in the cooking chambers 55, 57 with rear and front downturned flanges 78, 80 seating on the bottom walls 53 of said chambers 55, 57 and spacing said plates 77, 79 above and parallel to said bottom walls 53, as best shown in Figures 4 and 5.

A steam baffling plate 81 is provided on the bottom and along a contiguous solid edge portion 83 of each grid plate 77, 79, and is suitably secured thereto. The baffle plates 81 overlie the slots 59, 61 and incline inwardly and upwardly relative to said plates 77, 79 to deflect steam from said slots 59, 61 to rows of apertures 83 in said plates. A reinforcing angle bar 85 at the opposite edge of each baffle plate 77, 79 strengthens the same.

Referring now to Figures 2, 3, 4 and 5, as shown therein, a horizontal partition plate 87 extends between the partitions 51 above the well 13 and forms with said partitions a central chamber 89 in the section 3 for containing chili or other dressings.

Top closures 91, 93, 94 are provided for the cooking chambers 55, 57 and the central chamber 89 as follows. Each closure 91, 93 comprises a pair of rectangular rear and front closure plates 95, 97, the rear plate 95 being swingably and removably connected to the rear wall 43 of the section 3 by a channeled rear edge flange 99 hooking over said wall so that said plate 95 can be opened upwardly. A row of vent openings 101 in said rear plate 95 is adapted to be opened and closed by an upwardly opening damper flap 103 hinged, as at 105, on said plate and having a finger grip tab 107 thereon. The front plate 97 is slidable forwardly and rearwardly under the rear plate 95 and on ledges 109 in the top of the associated cooking chamber 55 or 57 to open one half of the chamber and is provided with an upturned front edge finger grip flange 111 for sliding the same.

The closure 94 for the central chamber 89 also comprises a pair of front and rear closure plates 113, 115 having side flanges 117, 119 adapting the same to fit over the top edges of the partitions 51. The rear plate 113 is hinged to the rear wall 43, as at 121, for opening upwardly. The front plate 115 is slidable under the rear plate 113 to open half the central chamber 89 and is provided with an upturned, front edge finger grip flange 122 for sliding the same.

A suitable pair of handles 123 is provided on the end walls 47 for removing and replacing the crown section 3.

Referring now to the use and operation of the described cooker. The water fed into the troughs 19, 21 is heated to generate steam by the heating elements 33, 35, the steam passing through the passages 63 and slots 59, 61 and being deflected by the baffle plates to spread under the grid plates 77, 79 and issue through the openings 83 into the cooking chambers 55, 57 to cook weiners therein. The heat from the cooking chambers 55, 57 is transferred through the partitions 51 to heat dressing or buns placed in the central chamber 89. The temperature in the chambers 55, 57 may be controlled by opening the damper flaps 103 and in the central chamber by sliding the front plate 115 rearwardly. Either cooking chamber 55, 57 may be used for cooking weiners or buns and either simultaneously or separately, and in this connection, it is to be noted that wattage controls of any suitable conventional means may be provided for the heating elements 33, 35 for determining the temperature at which the water in the troughs shall be heated for steaming or merely warming the material in the chambers 55, 57.

The front plates 97 of the closures 91, 93 may be slid rearwardly to open the front half of the chambers 55, 57 for serving purposes and the front plate of the closure 94 may be simultaneously opened for the same purpose in serving from the central chamber 89. On the other hand, the rear plates 95 of the closures 91, 93 may be swung upwardly to open the rear halves of the cooking chambers 55, 57 and the rear plate 113 of closure 94 may be similarly operated to open the rear half of central chamber 89. Obviously, the closures 91, 93 may be entirely removed to open chambers 55, 57.

The crown section 3 may be lifted off the base section for replacement by another similar crown section or for access to the interior of the base section for cleaning purposes.

The foregoing will, it is believed, suffice for a clear understanding of my invention.

Manifestly, the invention may be modified without departing from the inventive concept and right is herein reserved to such modifications as fall within the scope of the appended claims.

What I claim is:

1. A steam cooker comprising a rectangular open top base receptacle having a raised bottom, a water supply well extending transversely of said receptacle in the transverse center thereof with vertically slotted sides and a bottom below said raised bottom, a pair of water troughs extending along the sides of said well below the top thereof and above the bottom thereof and receiving water from the well through the slots in said sides, said raised bottom extending from the top of the troughs, means to feed water into the bottom of the well, a float controlled valve in said well for maintaining the water in the well at a predetermined level to find the same level in the troughs, means for electrically heating the water in the troughs to generate steam, a rectangular crown receptacle seating on and rising above said base receptacle and embodying a pair of cooking chambers at opposite sides of the well overlying said troughs and the raised bottom of the base receptacle, said chambers having bottom walls with steam inlet slots therein and being spaced above said troughs and the raised bottom of the base receptacle to form steam passageways from the troughs into said slots.

2. The combination of claim 1, said crown receptacle having a central transverse chamber therein between said cooking chambers spaced above the bottom walls of said heating chambers and heated from said cooking chambers.

3. The combination of claim 1, said crown receptacle having a condensation sump therein between said cooking chambers above said troughs, said bottom walls of the heating chambers slanting toward the top of said sump to drain condensation from the cooking chambers into said sump.

4. The combination of claim 1, and raised apertured grids in the bottoms of the cooking chambers for spacing material to be cooked off said bottom walls, said grids having bottom baffle plates thereon overlying said slots to deflect steam from said slots under said grid plates.

5. The combination of claim 1, said crown receptacle having sliding closures for said chambers including dampers.

References Cited in the file of this patent

UNITED STATES PATENTS

| | | |
|---|---|---|
| 2,347,490 | Legeman | Apr. 25, 1944 |
| 2,391,071 | Price | Dec. 18, 1945 |
| 2,564,990 | Parine | Aug. 21, 1951 |